US008893394B2

(12) United States Patent
Parkin

(10) Patent No.: US 8,893,394 B2
(45) Date of Patent: Nov. 25, 2014

(54) CARPENTRY GUIDE TOOL FOR MAKING CONSISTENT REVEALS

(76) Inventor: Simon P. Parkin, Castle Hayne, NC (US)

( * ) Notice: Subject to any disclaimer, the term of this patent is extended or adjusted under 35 U.S.C. 154(b) by 306 days.

(21) Appl. No.: 13/423,332

(22) Filed: Mar. 19, 2012

(65) Prior Publication Data

US 2013/0239419 A1  Sep. 19, 2013

(51) Int. Cl.
*E04F 21/00* (2006.01)
*G01B 5/14* (2006.01)
*G01B 3/30* (2006.01)

(52) U.S. Cl.
CPC .. *E04F 21/00* (2013.01); *G01B 3/30* (2013.01)
USPC ............................................. 33/194; 33/562

(58) Field of Classification Search
CPC ....... E04F 21/00; E04F 21/003; E04F 21/007; E05D 11/009; B23B 47/287; B25H 7/00
USPC ......................................... 33/194, 427, 567.1
See application file for complete search history.

(56) References Cited

U.S. PATENT DOCUMENTS

| | | | |
|---|---|---|---|
| 4,989,336 A | | 2/1991 | Waltrip, Jr. et al. |
| 5,123,172 A | | 6/1992 | Thrun |
| 5,604,988 A | * | 2/1997 | Costelloe ........................ 33/501 |
| 5,737,844 A | * | 4/1998 | Brumley .......................... 33/194 |
| 5,775,036 A | * | 7/1998 | Stanley, Sr. .................. 52/127.2 |
| 6,532,674 B2 | * | 3/2003 | Farese .............................. 33/194 |
| 6,807,777 B2 | | 10/2004 | Wagner et al. |
| 7,240,435 B1 | * | 7/2007 | Dowdakin ....................... 33/194 |
| 7,513,049 B2 | * | 4/2009 | Williams ........................... 33/42 |
| 7,591,073 B1 | * | 9/2009 | Eckles et al. ................... 33/194 |
| 7,743,516 B2 | * | 6/2010 | Gross ............................. 33/194 |
| 7,743,517 B1 | * | 6/2010 | Burgese ......................... 33/194 |
| 7,849,607 B2 | * | 12/2010 | Alvarez ...................... 33/567.1 |
| 8,096,056 B1 | * | 1/2012 | Murdock ........................ 33/194 |
| 2002/0133957 A1 | * | 9/2002 | Farese ............................. 33/194 |
| 2005/0022397 A1 | * | 2/2005 | Neblo ............................. 33/194 |
| 2009/0229139 A1 | * | 9/2009 | Alvarez ....................... 33/567.1 |
| 2011/0185583 A1 | * | 8/2011 | Hardee et al. .................. 33/194 |
| 2013/0239419 A1 | * | 9/2013 | Parkin ............................ 33/194 |

\* cited by examiner

*Primary Examiner* — Yaritza Guadalupe-McCall
(74) *Attorney, Agent, or Firm* — Humphries & King P.C.; Mark S. King

(57) ABSTRACT

A carpentry guide tool for ensuring precise and accurate measurements with regard to offsets and reveals commonly used in carpentry, particularly in the context of trim and molding around a door or window, is now disclosed. More specifically, the now disclosed carpentry tool is capable of use simultaneously in two orthogonal directions for the accurate measurement of reveals in the corner of a framed threshold and is designed for both ease of use and ease of manufacture. The now disclosed carpentry tool is of fixed dimension and static manufacture, mitigating the possibility that human error yields inconsistencies in measurement. The preferred embodiment is two concentric square prisms of differing sizes wherein every edge of one prism is congruent and parallel to an edge of the second prism, creating a reveal defined by the size differential between the two prisms.

3 Claims, 4 Drawing Sheets

CARPENTRY GUIDE TOOL FOR MAKING CONSISTENT REVEALS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

1. Field of the Invention

The present invention relates generally to tool for use in making accurate and precise measurements in the field of carpentry. More specifically, the present invention relates to an tool having specific use in the accurate and precise measuring or offsets and reveals common in the field of carpentry.

It is not uncommon for many carpenters or framers to be employed on a single carpentry project and, therefore, it is important that the methods and measurements utilized by varying carpenters or framers at work on a single carpentry project be consistent and predictable to ensure the integrity of the carpentry on the particular project as a whole—this is a primary object of the presently claimed invention.

The present invention specifically relates to a tool for use in making precise, consistent and accurate reveal on door and window frames during the installation of of frame molding. The present invention is further directed at a tool as above stated wherein the same my be cheaply manufactured, carried with ease, and designed in such a simplistic way as to reduce the possibility of human error in the use of the tool.

2. Background Art

In the field of carpentry it is frequent practice in the construction of thresholds for doors, windows and the like to install trim work to serve an ornamental function by hiding what would otherwise be roughed in structural framing of the window, door or the like. In doing so, a carpenter must have the capacity to measure and set a consistent reveal around the perimeter of the roughed in structural framework, the consistent reveal to serve as the guide for the placement of decorative trim or molding to "finish" the threshold in relation to adjacent sheetrock and/or drywall. It construction of said thresholds, consistency in the measurement of the reveals ultimately determines whether the appearance of the trim, molding and "finished" thresholds are going to appear consistent throughout the construction project and, thus, whether the integrity of the carpentry throughout the project will meet customer expectations.

Despite the practice of setting reveals according to known measurements, commonly ¼", ½" or ¾", differing carpenters may and frequently do differ in their respective calculations of these known measurements. Be it difference in measuring convention or just pure human error, the result of varying carpenters working on a single construction product with inconsistent methods of measuring what should be a singular and constant, fixed reveal is inconsistencies in appearance as between thresholds and, thus, poor aesthetic craftsmanship in the overall project.

The field of carpentry is no stranger to the use of varying guides, gauges and tools to ensure consistency in measurement. However, with regard to setting reveals in the construction of thresholds, it has become desirable to provide a tool that is (i) easily portable, (ii) of small enough size to allow a single carpenter to manipulate the tool while simultaneously marking a measured reveal, (iii) manufactured in a such a way as to mitigate the likelihood and opportunity of inconsistent measurements due to human error or divergent measuring conventions, and (iv) capable of use simultaneously in two orthogonal directions for the accurate measurement of reveals in the corner of a given threshold. It has further become desirable to provide a tool that serves all of the aforementioned purposes while minimizing the number of components comprising the tool, thus, enhancing the efficiency and affordability of manufacture of the same.

The state of the prior art in the field of carpentry is such that several developed guides, gauges, or tools meet one or more of the aforementioned needs and desirables, however, no single inventive concept has emerged that addresses all of the aforementioned aspirations. For instance, U.S. Pat. No. 4,989,336 to Waltrip Jr. et al. (the "336 patent") discloses a trim positioning device intended to allow a carpenter to measure consistent reveals with ease. However, in creating a device that must be adjusted to the predetermined magnitude of reveal, the 336 patent invites human error in the use of the device and, in this sense, is not truly any better than a carpenter using a simple straight ruler to measure the predetermined offset of the reveal. Further, the 336 patent discloses a guide tool having several varying components, many of which are fairly complex in design so as to make the efficient and affordable manufacture of the tool questionable. Still further, the 336 patent discloses a guide tool that may only be utilized in a single orthogonal direction at any one time, thus requiring repositioning of the device for the measuring of both the horizontal reveal and vertical reveal encountered at the corner of a subject threshold.

U.S. Pat. No. 5,123,172 to Thrun (the "172 patent") discloses an invention very similar to that of the 336 patent. Specifically, the gauge disclosed in the 172 patent is adjustable, is comprised of a plurality of components, and is capable of use in only a single orthogonal direction at a time. In this sense, the gauge disclosed in the 172 patent suffers from many of the same shortcomings as the 336 patent device, including the invitation of human error in measuring, a perceived higher cost of manufacture and similar difficulties in measuring reveals in the corner of a threshold. The 172 patent does, however, disclose a securing arm that allows the gauge to be affixed to the framed threshold during measurement, thus allowing a user to simultaneously manipulate the gauge while measuring the desired reveal.

U.S. Pat. No. 5,737,844 to Brumley (the "844 patent") and U.S. Pat. No. 7,743,517 to Burgese (the "517 patent") represent what the present inventor believes to be, outside of the present disclosed invention, the most comprehensive solutions to the aforementioned suite of problems and, even so, each have expressly disclosed carpentry guides that are adjustable, again allowing for the possibility of human error to compromise the integrity of a consistent reveal. Further, both the 517 patent and 844 patent include a plurality of components that, in turn, require a plurality of molds to manufacture. In this sense, the 517 patent and the 844 patent would appear to be more expensive to manufacture than the now disclosed invention. It should be noted that of the prior art cited, the 844 patent is the only disclosure that suggests a tool capable of use in multiple orthogonal directions.

As can be appreciated from the above cited prior art examples, the state of the art favors tools, gauges, and guides that are adjustable and, thus, subject to human error and differences in measurement between individual users. The opportunity to adjust these devices render the devices no more accurate and precise in the measurement and marking of a reveal than the use of other standard measurement practices known in the art. Further, incidental to the adjustable nature of the above cited prior art examples is the tendency of these tools, gauges and guides to have a plurality of moving parts and components, thus calling into question the efficiency and affordability with which these devices may be manufactured.

BRIEF SUMMARY OF THE INVENTION

Broadly stated, the present invention is an apparatus for use in making consistent measurements in carpentry. More specifically, the present invention is a carpentry guide tool for ensuring precise and accurate measurements for reveals and offsets of the type found in the trim and molding around a door, window, or similar threshold requiring wood framing. In more specific embodiment, the present invention is a carpentry guide tool for ensuring precise and accurate measurements comprising two polygonal prisms of differing sizes wherein a face of a first prism is in flush contact with a face of a second prism such that the two prisms in combination create at least one consistent reveal along an edge of the tool, the reveal defined by the size differential between the respective surface areas of the first prism face in flush contact with the second prism face.

It is an object of the present invention to provide a tool for the creation of reveals and offsets in general carpentry that is both simple to use and simple to manufacture. Simplicity of use is contemplated to mitigate the risk of human error in using the device and simplicity of manufacture is contemplated to make the mass production of the device both efficient and cost effective.

It is a further object of the present invention to provide a tool for the creation of reveals and offsets in general carpentry wherein the tool is capable of use simultaneously in two orthogonal directions for the accurate measurement of reveals in the corner of a framed threshold. In this sense, the present inventor believes that the present invention will have particular utility in the construction of consistent reveals with regard to the trim and molding around a corner of a framed window, door or other similar threshold.

It is still yet another object of the present invention to provide a tool for the creation of reveals and offsets in general carpentry wherein the tool is readily portable and convenient to use by a single user simultaneously manipulating the tool to a desired position and measuring the offset for the desired reveal.

It is still yet another object of the present invention to provide a tool of fixed dimension, completely static in manufacture and unable to be adjusted or altered by a user. The fixed dimension, static manufacture greatly reduces the possibility that human error yields inconsistencies in measurement of a desired reveal around a framed door, window, or other threshold.

It is still yet another object of the present invention to provide a series of tools serving the aforementioned objects that are of differing gauges in terms of their respective reveals, said series of tools being able to be readily transported and maintained by a carpenter as would any other carpentry tool commonly used in the trade.

These and other advantages of the present disclosed apparatus will become apparent to one skilled in the art in view of the figures and description of the figures stated below.

BRIEF DESCRIPTION OF THE SEVERAL VIEWS OF THE DRAWING

The aforementioned advantages of the invention, as well as additional advantages thereof will be more fully understood as a result of a detailed description of the preferred embodiment when taken in conjunction with the accompanying drawings in which.

DETAILED DESCRIPTION OF THE INVENTION

Figure 1A:
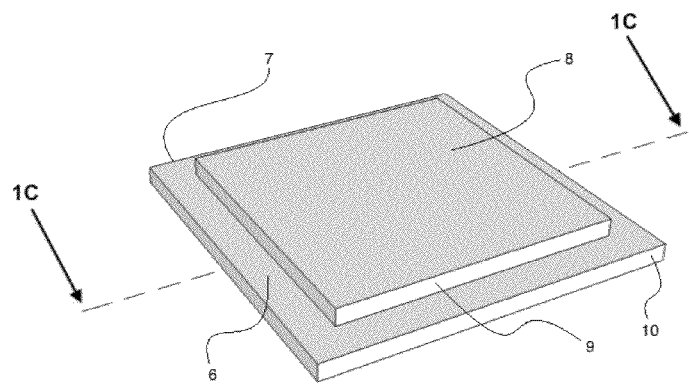
FIG. 1A is a perspective view of the preferred embodiment from a viewpoint located above the device.

Referring first to FIG. 1A, there is shown a perspective view of the preferred embodiment from a viewpoint located above the device. Specifically, FIG. 1A shows the inventive concept in its preferred embodiment or best mode as determined by the inventor, said embodiment comprising a first square prism 7 and a second square prism 8, said first prism 7 being an order of magnitude larger than said second prism 8, but in all other respects said first prism 7 and said second prism 8 being congruent. The second prism 8 is arranged in such a way as to have one of its two square faces hidden in constant and flush contact a one of the two square faces of the first prism 7. Further, the first prism 7 and second prism 8 are oriented with regard to one another so that the first prism 7 and second prism 8 are concentric and each planar edge 9 of the second prism 8 is congruent and parallel to each planar edge 10 of the first prism 7. The first prism 7 and second prism 8, via their concentric orientation, are arranged in such a way as to create a reveal 6 comprising the excess surface area of the square face of the first prism 7 not in direct, constant, and flush contact with a face of the second prism 8. Further incident to the concentric orientation of the first prism 7 and second prism 8 is the quality that the reveal 6 is consistent in dimension extending outward at a perpendicular from each planar edge 9 of the second prism 8 to the intersection of the reveal at a perpendicular with each planar edge 10 of the first prism 7.

Figure 1B:
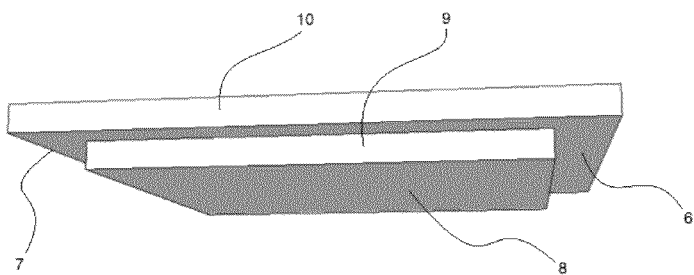
FIG. 1B is a perspective view of the same preferred embodiment as shown in FIG. 1A, the view being from a viewpoint located below the device and the device being inverted from that orientation shown in FIG. 1A.

Referring now to FIG. 1B there is shown a perspective view of the same preferred embodiment as shown in FIG. 1A, the view in FIG. 1B being from a viewpoint located below the device and the device being inverted from that orientation shown in FIG. 1A. As in FIG. 1A, shown in FIG. 1B is the inventive concept in its preferred embodiment or best mode as determined by the inventor, said embodiment comprising a first square prism 7 and a second square prism 8, said first prism 7 being an order of magnitude larger than said second prism 8, but in all other respects said first prism 7 and said second prism 8 being congruent. The second prism 8 is arranged in such a way as to have one of its two square faces hidden in constant and flush contact a one of the two square faces of the first prism 7. Further, the first prism 7 and second prism 8 are oriented with regard to one another so that the first prism 7 and second prism 8 are concentric and each planar edge 9 of the second prism 8 is congruent and parallel to each planar edge 10 of the first prism 7. The first prism 7 and second prism 8, via their concentric orientation, are arranged in such a way as to create a reveal 6 comprising the excess surface area of the square face of the first prism 7 not in direct, constant, and flush contact with a face of the second prism 8. Further incident to the concentric orientation of the first prism 7 and second prism 8 is the quality that the reveal 6 is consistent in dimension extending outward at a perpendicular from each planar edge 9 of the second prism 8 to the intersection of the reveal at a perpendicular with each planar edge 10 of the first prism 7. In particular, FIG. 1B provides a clearer direct view of a planar edge 9 of the second prism 8 and a planar edge 10 of the first prism and further demonstrates that the inventors intention behind the inventive concept is not that it have a single base defined by a face of the first prism 7, but rather that either the first prism 7 or the second prism 8, in fact, serve as the base at any given time. The only design imperatives of the device is that the reveal 6 be consistent in dimension all the way around the device and that the reveal be perpendicular to each planar edge 9 of the second prism 8 and each planar edge 10 of the first prism 7.

Figure 1C:
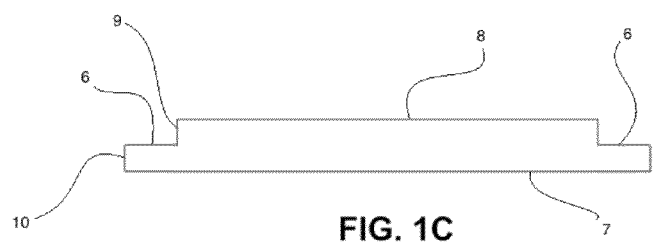
FIG. 1C is a cross-section view of the preferred embodiment taken along line 1C-1C in FIG. 1A.

Referring now to FIG. 1C there is shown a cross-section view of the preferred embodiment taken along line 1C-1C in FIG. 1A. Specifically, FIG. 1C shows the inventive concept in its preferred embodiment or best mode as determined by the inventor, said embodiment being demonstrated in cross-section along line 1C-1C in FIG. 1A and comprising a bottom first prism 7 portion and an upper second prism 8 portion, the first prism 7 portion and second prism 8 portion being demonstrated in cross section as a single article of manufacture being formed of a homogenous and contiguous material. In silhouette, FIG. 1C shows equal and opposite reveals 6 on each side of the second prism 8 portion and further demonstrates that perpendicular intersection of said reveals 6 with the planar edge 9 of the second prism 8 portion and the planar edge 10 of the first prism 7 portion.

Figure 2:
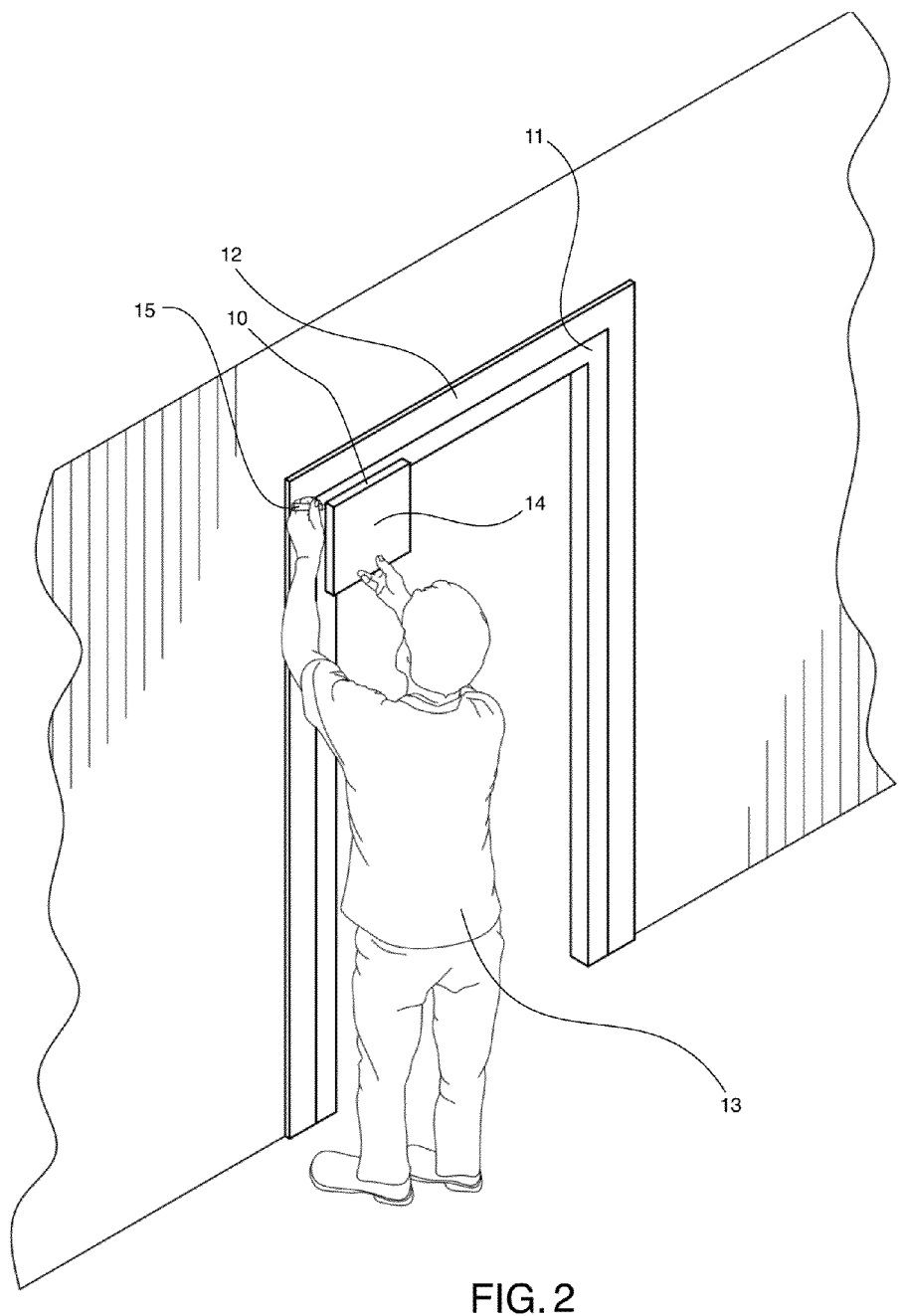
FIG. 2 is a perspective view demonstrating the preferred embodiment as shown in FIG. 1A, FIG. 1B, and FIG. 1C in use by a single user.

Referring now to FIG. 2 there is shown a perspective view demonstrating the preferred embodiment as shown in FIG. 1A, FIG. 1B, and FIG. 1C in use by a single user 13. Specifically, FIG. 2 shows the now contemplated inventive concept in its preferred embodiment or best mode as determined by the inventor, said embodiment being demonstrated in use by a single user 13 in the context of creating a precise and consistent reveal 11 between the framed threshold of a doorway and the decorative trim 12 around the doorway, the trim 12 added for aesthetic appeal. As depicted in FIG. 2, the device 14 is utilized by positioning the device 14 in such a way as to allow the planar edge 10 of the larger surface area prism of the device 14 to intersect at a perpendicular the surface along which the reveal 11 is desired. The user 13 may then mark a consistent reveal 11 by running a marking utensil 15 along the planar edge 10 of the larger surface area prism of the device 14. Based upon the marks made with the marking utensil 15 along the perpendicular intersection of the planar edge 10 of the larger surface area prism of the device 14 with the surface along which the reveal 11 is desired, the user 13 may then place the trim 12 along the framed threshold in such a way as to create a precise and consistent reveal 11 as desired by the user 13. It should also be noted that FIG. 2 further demonstrates, via the depicted placement of the device 14 in the upper left corner of the framed threshold, that the device 14 has the capacity to enable a user 13 to measure the desired reveal 11 in two orthogonal directions during a single use, measuring along the upper horizontal planar edge 10 of the device 14 as depicted in FIG. 2, or along a counterpart vertical planar edge of the device 14 along the left side of the framed threshold.

Figure 3:
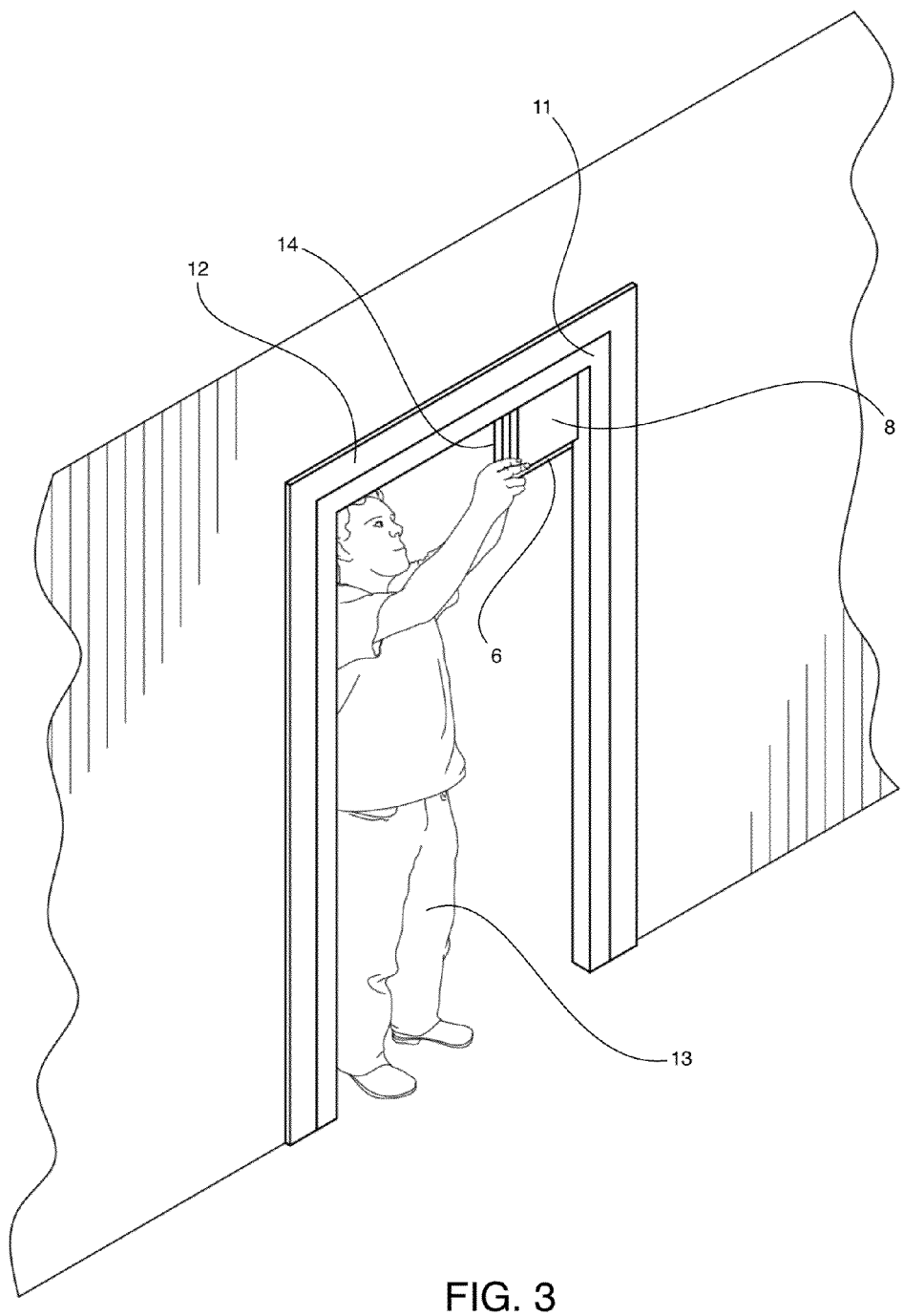
FIG. 3 is a perspective view, inverted from that shown in FIG. 2, again demonstrating the preferred embodiment as shown in FIG. 1A, FIG. 1B, and FIG. 1C in use by a single user.

Referring now to FIG. 3 there is shown a perspective view, inverted from that shown in FIG. 2, again demonstrating the preferred embodiment as shown in FIG. 1A, FIG. 1B, and FIG. 1C in use by a single user 13. As compared to FIG. 2, FIG. 3 depicts the identical use of the device 14, however the viewpoint in FIG. 3 is from the opposite side of the threshold as depicted in FIG. 2, thus showing the side of the device 14 not previously depicted in use in FIG. 2. Specifically, FIG. 3 shows the now contemplated inventive concept in its preferred embodiment or best mode as determined by the inventor, said embodiment being demonstrated in use by a single user 13 in the context of creating a precise and consistent reveal 11 between the framed threshold of a doorway and the decorative trim 12 around the doorway, the trim 12 added for aesthetic appeal. It should be noted that from the viewpoint depicted in FIG. 3, the reveal 11 shown is not the actual reveal 11 presently being created through the use of the device 14 by the user 13, but rather is an equal and opposite reveal 11 depicted to be demonstrative of what the user 13 is presently creating on the other side of the threshold through use of the device 14. Similarly, the trim 12 shown is intended to be demonstrative of the trim 12 being offset by the user 13 through use of the device 14 along the other side of the threshold. Most significantly, FIG. 3 demonstrates the manner in which the device 14 is set against the framed threshold by placement of the planar edge of the smaller prism portion 8 of the device 14 flush against the threshold framework, thus allowing the reveal 6 of the device 14, as identified in FIGS. 1A, 1B, and 1C, to lay flush against the surface area on the threshold framing upon which the user 13 intends to measure the decorative reveal 11 and place the concomitant trim 12. In this sense, the gauge of the reveal 6 on the device 14 will be equal and opposite with the reveal 11 constructed upon the doorway by the user 13. As in FIG. 2, it should again be noted in FIG. 3 that via the depicted placement of the device 14 in the upper right corner of the framed threshold, that the device 14 has the capacity to enable a user 13 to measure the desired reveal 11 in two orthogonal directions during a single use, benefiting simultaneously from the gauge of the reveal 6 of the device 14 in a horizontal direction along the header of the doorway and vertically along the right side of the doorway.

Figure 4A:
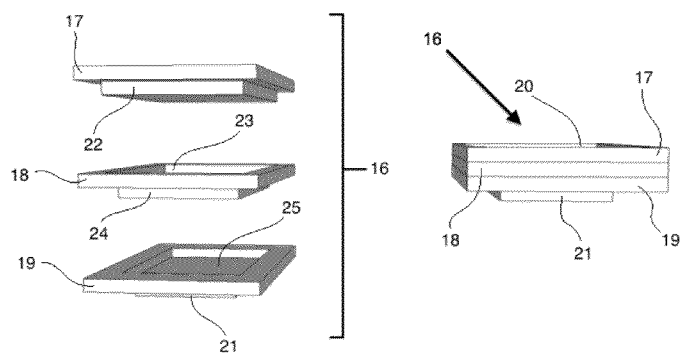
FIG. 4A is a perspective and blown-apart view of a plurality of a second preferred embodiment of the device, said view being from a viewpoint straight on from one side of the respective devices.

Referring now to FIG. 4A there is shown a perspective and blown-apart view of a plurality of a second preferred embodiment of the device, said view being from a viewpoint straight on from one side of the respective devices. Specifically, FIG. 4A shows the now contemplated inventive concept in an alternative preferred embodiment or best mode as determined by the inventor, said alternative embodiment being nearly identical to the first identified preferred embodiment as depicted in FIG. 1A, FIG. 2A, and FIG. 3A, however, the now introduced alternative embodiment having a cavity in the surface area of the larger prism of the device intended to receive and hold via friction the smaller prism protrusion of a second device. More specifically, FIG. 4A shows three independent units 16 of the now contemplated inventive concept, each of the units being of the now disclosed alternative embodiment and being characterized by a larger first prism portion 17 18 19, a smaller second prism portion 21 22 24, and cavities 20 23 25 in the exposed face of the respective larger first prism portions 17 18 19. The three independent units 16 conveniently snap together by the insertion of a smaller second prism portion 22 of a first unit into an equal and opposite cavity 23 of a second unit. Similarly, a smaller second prism portion 24 of the second unit inserts into an equal and opposite cavity 25 of a third unit. In this sense, the three independent units 16 snap together, leaving exposed only the smaller second prism portion 21 of the third unit and the cavity 20 in the exposed face of the larger first prism portion 17 of the first unit. The now disclosed alternative embodiment is contemplated to offer advantages in the convenience of storage and mobility of the respective devices during use and transport by a user.

Figure 4B:
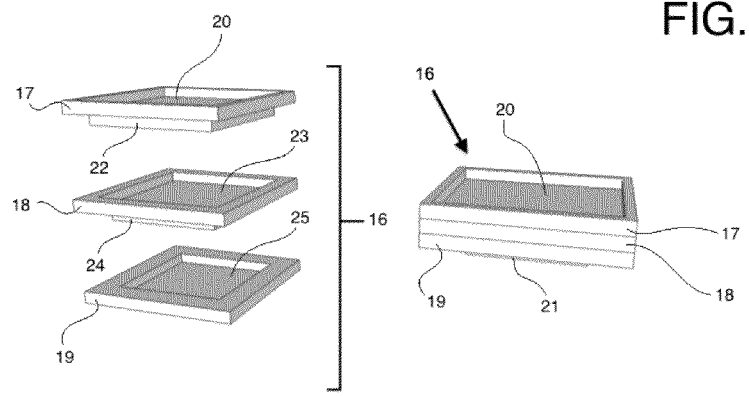
FIG. 4B is a perspective and blown-apart view of the same plurality of a second preferred embodiment of the device as shown in FIG. 4A, said view being from a viewpoint slightly above the respective devices.

Referring now to FIG. 4B there is shown a perspective and blown-apart view of the same plurality of a second preferred embodiment of the device as shown in FIG. 4A, said view being from a viewpoint slightly above the respective devices. FIG. 4B again shows the alternative embodiment depicted in FIG. 4A, said embodiment contemplated to offer advantages in the convenience of storage and mobility of the respective devices during use and transport by a user. Specifically, FIG. 4B shows three independent units 16 of the now contemplated inventive concept, each of the units being of the now disclosed alternative embodiment and being characterized by a larger first prism portion 17 18 19, a smaller second prism portion 21 22 24, and cavities 20 23 25 in the exposed face of the respective larger first prism portions 17 18 19. As in FIG. 4A, the three independent units 16 conveniently snap together by the insertion of a smaller second prism portion 22 of a first unit into an equal and opposite cavity 23 of a second unit. Similarly, a smaller second prism portion 24 of the second unit inserts into an equal and opposite cavity 25 of a third unit. In this sense, the three independent units 16 snap together, leaving exposed only the smaller second prism portion 21 of the third unit and the cavity 20 in the exposed face of the larger first prism portion 17 of the first unit. The main advantage of FIG. 4B over FIG. 4A is the demonstration of the aforementioned qualities of this alternative embodiment from a slightly different angle of view to ensure that one skilled in the art may fully appreciate the construction of the same as well as the particulars of utilization.

Figure 4C:
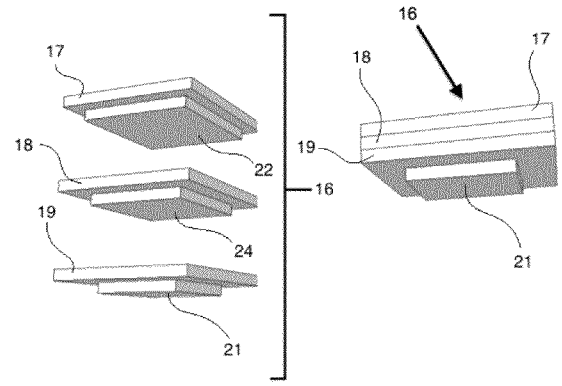
FIG. 4C is a perspective and blown-apart view of the same plurality of a second preferred embodiment of the device as shown in FIG. 4A and FIG. 4B, said view being from a viewpoint slightly below the respective devices.

Referring now to FIG. 4C there is shown a perspective and blown-apart view of the same plurality of a second preferred embodiment of the device as shown in FIG. 4A and FIG. 4B, said view being from a viewpoint slightly below the respective devices. FIG. 4C again shows the alternative embodiment depicted in FIG. 4A and FIG. 4B, said embodiment contemplated to offer advantages in the convenience of storage and mobility of the respective devices during use and transport by a user. Specifically, FIG. 4C shows three independent units 16 of the now contemplated inventive concept, each of the units being of the now disclosed alternative embodiment and being characterized by a larger first prism portion 17 18 19, a smaller second prism portion 21 22 24, and cavities in the exposed face of the respective larger first prism portions 17 18 19. It should be noted that the viewpoint depicted in FIG. 4C does not feature the cavities due to a prohibitive angle of view. As in FIG. 4A and FIG. 4B, the three independent units 16 conveniently snap together by the insertion of a smaller second prism portion 22 of a first unit into an equal and opposite cavity in the larger first prism portion 18 of a second unit. Similarly, a smaller second prism portion 24 of the second unit inserts into an equal and opposite cavity in the larger first prism portion 19 of a third unit. In this sense, the three independent units 16 snap together, leaving exposed only the smaller second prism portion 21 of the third unit and the cavity in the exposed face of the larger first prism portion 17 of the first unit. The main advantage of FIG. 4C over FIG. 4A and FIG. 4B is the demonstration of the aforementioned qualities of this alternative embodiment from a slightly different angle of view to ensure that one skilled in the art may fully appreciate the construction of the same as well as the particulars of utilization.

While the foregoing written description of the disclosed invention enables one of ordinary skill to practice and use what is considered presently to be the best mode thereof, those of ordinary skill will understand and appreciate the existence of variations, combinations, and equivalents of the specific embodiment, method and examples herein. The invention should therefore not be limited by the above described embodiment, method and examples, but by all embodiments and methods within the scope and spirit of the invention as claimed.

Further, while specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A carpentry guide tool for ensuring precise and accurate measurements comprising two polygonal prisms of differing sizes wherein the face of a first prism is in flush contact with a face of a second prism such that the two prisms in combination create at least one consistent reveal along an edge of the tool, the reveal defined by the size differential between the respective surface areas of the first prism face in flush contact with the second prism face, and wherein the face of the larger prism not in contact with a face of the smaller prism features a recess in the surface of the face sufficient in size and shape to receive the protruding smaller prism of a second tool of the type now claimed.

2. A carpentry guide tool for ensuring precise and accurate measurements comprising—two polygonal prisms of differing sizes wherein the face of a first prism is in fixed and flush contact with a face of a second prism such that the two prisms in combination create at least one consistent reveal along an edge of the tool, the reveal defined by the size differential between the respective surface areas of the first prism face in flush contact with the second prism face, and wherein the first prism and second prism are interchangeable in relation to each other; and fastening means facilitating the fixed and flush contact between the first and second prisms.

3. A carpentry guide tool for ensuring precise and accurate measurements comprising two polygonal prisms of differing sizes wherein the face of a first prism is in flush contact with a face of a second prism such that the two prisms in combination create at least one consistent reveal along an edge of the tool, the reveal defined by the size differential between the respective surface areas of the first prism face in flush contact with the second prism face, and wherein the first prism and second prism are interchangeable in relation to each other.

\* \* \* \* \*